(12) United States Patent
Hu (10) Patent No.: US 11,837,152 B2
(45) Date of Patent: Dec. 5, 2023

(54) DRIVING CIRCUIT AND DISPLAY PANEL

(71) Applicant: TCL CHINA STAR OPTOELECTRONICS TECHNOLOGY CO., LTD., Guangdong (CN)

(72) Inventor: Daobing Hu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 246 days.

(21) Appl. No.: 17/599,996

(22) PCT Filed: Aug. 13, 2021

(86) PCT No.: PCT/CN2021/112497
§ 371 (c)(1),
(2) Date: Sep. 29, 2021

(87) PCT Pub. No.: WO2023/272893
PCT Pub. Date: Jan. 5, 2023

(65) Prior Publication Data
US 2023/0267873 A1     Aug. 24, 2023

(30) Foreign Application Priority Data
Jun. 30, 2021   (CN) .......................... 202110734067.8

(51) Int. Cl.
*G09G 3/32*         (2016.01)
*G02F 1/1335*    (2006.01)
(Continued)

(52) U.S. Cl.
CPC ......... *G09G 3/32* (2013.01); *G02F 1/133603* (2013.01); *G02F 1/133611* (2013.01);
(Continued)

(58) Field of Classification Search
CPC .................. G09G 3/32; G09G 3/3426; G09G 2320/0233; G09G 2330/02;
(Continued)

(56) References Cited

U.S. PATENT DOCUMENTS

2019/0129171 A1*  5/2019  Narushima ........ G02B 27/0101
2019/0129253 A1*  5/2019  Moon ............... G02F 1/133514
(Continued)

FOREIGN PATENT DOCUMENTS

CN    205566743 U    9/2016
CN    209044228 U    6/2019
(Continued)

*Primary Examiner* — Sejoon Ahn
(74) *Attorney, Agent, or Firm* — HAMRE, SCHUMANN, MUELLER & LARSON, P.C.

(57) ABSTRACT

The present disclosure discloses a driving circuit and a display panel. The driving circuit includes: a first wire; a second wire; and a plurality of third wires, spaced apart from each other, wherein one end of each third wire is electrically connected to the first wire, and an other end of the each third wire is electrically connected to the second wire. A current adjustment unit and at least one light-emitting unit are disposed on the each third wire. Each current adjustment unit has a different resistance value. The current adjustment unit on the each third wire that is farther away from a first signal input terminal of the first wire has a smaller resistance value.

20 Claims, 3 Drawing Sheets

(51) Int. Cl.
*G02F 1/13357* (2006.01)
*G09G 3/34* (2006.01)

(52) U.S. Cl.
CPC ..... *G02F 1/133612* (2021.01); *G09G 3/3426* (2013.01); *G09G 2320/0233* (2013.01); *G09G 2330/02* (2013.01)

(58) Field of Classification Search
CPC ......... G02F 1/133612; G02F 1/133603; G02F 1/133611
See application file for complete search history.

(56) References Cited

U.S. PATENT DOCUMENTS

| | | | |
|---|---|---|---|
| 2019/0130797 A1* | 5/2019 | Pan | G06F 3/1446 |
| 2019/0130819 A1* | 5/2019 | Chen | G09G 3/32 |
| 2019/0130823 A1* | 5/2019 | Yang | G09G 3/3225 |
| 2021/0043150 A1 | 2/2021 | Lee et al. | |

FOREIGN PATENT DOCUMENTS

| | | |
|---|---|---|
| CN | 110579915 A | 12/2019 |
| CN | 111999936 A | 11/2020 |
| CN | 112133247 A | 12/2020 |
| CN | 112596300 A | 4/2021 |
| CN | 112767880 A | 5/2021 |
| CN | 112991951 A | 6/2021 |

* cited by examiner

DRIVING CIRCUIT AND DISPLAY PANEL

FIELD OF INVENTION

The present disclosure relates to the field of display technologies, and in particular, to a display driving circuit and a display panel.

BACKGROUND OF INVENTION

As emerging display technologies, mini-light emitting diode (mini-LED) display and micro-light emitting diode (micro-LED) display have a higher contrast ratio, higher brightness, and wider color gamut compared with the traditional liquid crystal display LCD. Compared with the current organic light-emitting diode (OLED) display, the mini-LED display and the micro-LED display have better performance in brightness, lifespan, and power consumption, and have become a hot spot for the layout of major panel manufacturers.

However, a mini-LED display panel and a micro-LED display panel are current-driven LEDs to emit light, and the LED is relatively sensitive to a small change in a current. Therefore, the small change in the current may cause a relatively large change in brightness.

Therefore, the mini-LED display panel and the micro-LED display panel have higher requirements for a voltage drop (IR drop) of a back panel. However, due to voltage division of the trace resistance, a voltage and a current of the LED at a near end of a chip on film (COF) will be higher than a voltage and a current of the LED at a far end of the COF. In this way, brightness at the near end of the COF is higher than that at the far end of the COF, resulting in uneven brightness of the display panel, and seriously affecting the optical effect of the display panel.

SUMMARY OF INVENTION

Technical Problem

Embodiments of the present disclosure provide a driving circuit and a display panel, so as to resolve the problem of uneven brightness of the current display panel.

Technical Solution

An embodiment of the present disclosure provides a driving circuit, including:

a first wire, including a first signal input terminal and a first signal output terminal;

a second wire, including a second signal input terminal and a second signal output terminal, wherein the second wire is spaced apart from the first wire, and the second signal input terminal and the first signal input terminal are located on a same side; and a plurality of third wires, spaced apart from each other, wherein one end of each third wire is electrically connected between the first signal input terminal and the first signal output terminal, and an other end of the each third wire is electrically connected between the second signal input terminal and the second signal output terminal, wherein a current adjustment unit and at least one light-emitting unit are disposed on the each third wire, each current adjustment unit has a different resistance value, and the current adjustment unit on the each third wire that is farther away from the first signal input terminal and the second signal input terminal has a smaller resistance value.

Optionally, the first signal input terminal is configured to receive a first level the second signal input terminal is configured to receive a second level signal, the first level signal is a VDD power signal, and the second level signal is a VSS power signal.

Optionally, potentials of the first level signal at the first signal input terminal and the first signal output terminal are different, and potentials of the second level signal at the second signal input terminal and the second signal output terminal are different.

Optionally, the first wire includes a plurality of first nodes spaced apart between the first signal input terminal and the first signal output terminal, and each first node is correspondingly electrically connected to one end of the each third wire; and the second wire includes a plurality of second nodes spaced apart between the second signal input terminal and the second signal output terminal, and each second node is correspondingly electrically connected to an other end of the each third wire.

Optionally, a resistance value of the first wire between any two adjacent first nodes is m, and a resistance value of the second wire between any two adjacent second nodes is m, wherein m>0.

Optionally, a quantity of the third wires is n, and $1^{st}$-$n^{th}$ third wires are sequentially arranged in a direction away from the first signal output terminal and the second signal input terminal, wherein a resistance value of the current adjustment unit on the nth third wire is $n*(n-1)*m$, and n is an integer greater than 1.

Optionally, a spacing between any two adjacent first nodes is a, and a spacing between any two adjacent second nodes is a, wherein a>0.

Optionally, the current adjustment unit is a trace having a same width as the first wire and the second wire, and a trace length of the current adjustment unit on the $n^{th}$ third wire is $n*(n-1)*a$, wherein n is an integer greater than 1.

Optionally, the current adjustment unit is disposed on a same layer as the each third wire, and is a serpentine metal trace, a metal block, a digital resistor, or a chip resistor.

An embodiment of the present disclosure further provides a display panel, including: a substrate base plate, a COF, and any of the driving circuits, wherein the plurality of light-emitting units and the driving circuit array are disposed on the substrate base plate in an array, the COF is disposed on a side of the substrate base plate, and the first wire and the second wire in the driving circuit are electrically connected to the COF respectively.

Beneficial Effects

In the driving circuit and the display panel disclosed in the present disclosure, the current adjustment units corresponding to different resistance values are electrically connected to the third wires spaced apart from each other respectively. In this way, currents inputted to each third wire are same or very similar, thereby ensuring that currents connected to the light-emitting units on each third wire are consistent. Therefore, the brightness uniformity of the display panel is ensured, and the optical effect of the display panel is improved.

BRIEF DESCRIPTION OF DRAWINGS

To describe the technical solutions in the embodiments of the present disclosure more clearly, the following briefly describes accompanying drawings required for describing the embodiments. Apparently, the accompanying drawings

DETAILED DESCRIPTION OF PREFERRED EMBODIMENTS

The technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by a person skilled in the art based on the embodiments of the present disclosure without creative efforts shall fall within the protection scope of the present disclosure. In addition, it should be understood that the specific implementations described herein are merely used for describing and illustrating the present disclosure, but are not intended to limit the present disclosure. In the present disclosure, unless otherwise stated, the directional terms such as "up" and "down" generally refer to directions when a device is in actual use or a working state, and specifically refer to drawing directions in the corresponding drawing; and "inside" and "outside" refer to positions relative to the contour of the device.

Many different implementations or examples are provided below to implement different structures of the present disclosure. To simplify the disclosure of the present disclosure, the following describes components and settings of particular examples. Certainly, the components and settings are merely examples, and are not intended to limit the present disclosure. In addition, in the present disclosure, reference numbers and/or reference letters may be repeated in different examples. Such repetition is intended to simplify and clarify the present disclosure, and does not indicate a relationship between various implementations and/or settings that are discussed. In addition, the present disclosure provides examples of various specific processes and materials, but a person skilled in the art can be aware of the application of other processes and/or the use of other materials. Detailed descriptions are separately provided below. It should be noted that the description sequence of the following embodiments is not intended to limit preference orders of the embodiments.

The present disclosure provides a driving circuit. The driving circuit includes a first wire, a second wire, and a plurality of third wires spaced apart from each other. The first wire includes a first signal input terminal and a first signal output terminal. The second wire includes a second signal input terminal and a second signal output terminal. The second wire is spaced apart from the first wire. The second signal input terminal and the first signal input terminal are located on a same side. The second signal output terminal and the first signal output terminal are located on a same side. One end of each third wire is electrically connected between the first signal input terminal and the first signal output terminal, and an other end of the each third wire is electrically connected between the second signal input terminal and the second signal output terminal.

A current adjustment unit and at least one light-emitting unit are disposed on the each third wire. Each current adjustment unit has a different resistance value. The current adjustment unit on the each third wire that is farther away from the first signal input terminal has a smaller resistance value. In the driving circuit disclosed in the present disclosure, the current adjustment units having different resistance values are respectively disposed on the third wires spaced apart from each other, so as to offset a voltage drop of a signal on the first wire and the second wire. In this way, currents inputted to the corresponding light-emitting units using the third wires are same or very similar, so that the luminous brightness of the light-emitting units is consistent. Therefore, the brightness uniformity of the display panel is improved, and the optical effect of the display panel is improved.

Figure 1:
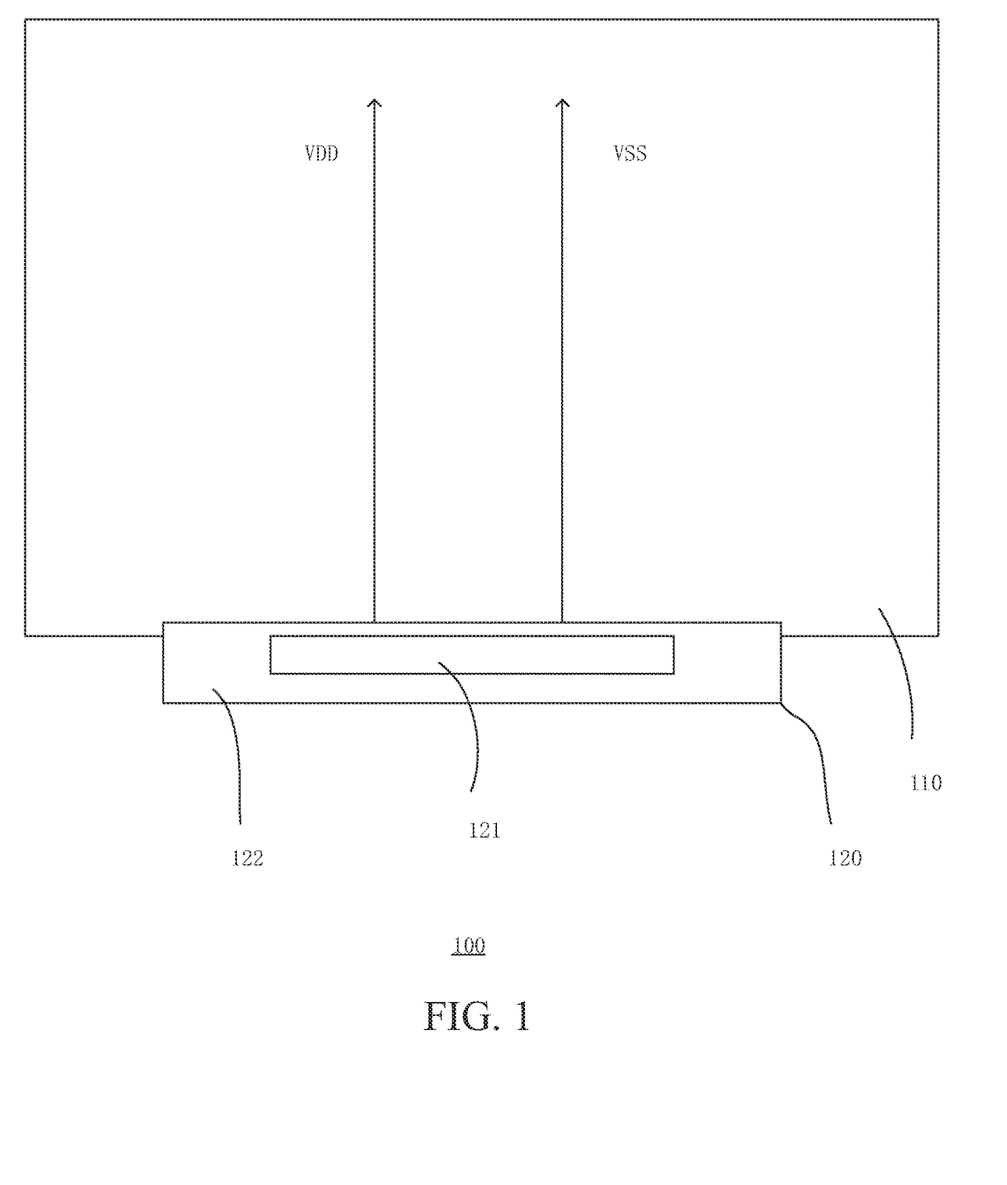
FIG. 1 is a schematic diagram of a display panel according to an embodiment of the present disclosure.

The embodiments of the present disclosure provide a display panel and a driving circuit applicable to the display panel. The display panel can be a mini-LED display panel or a micro-LED display panel that directly uses LED units as pixels to complete display. Referring to FIG. 1, the display panel 100 includes a substrate base plate 110, a driving circuit (not shown in the figure), and a COF 120. The substrate base plate 110 can be a flexible base plate or a rigid base plate. The driving circuit is disposed on the substrate base plate 110. The COF 120 is disposed on a side of the substrate base plate 110, and is electrically connected to the driving circuit on the substrate base plate 110 by means of bonding. The COF 120 includes a driving chip 121 and a flexible printed circuit (FPC) board 122. The driving chip 121 is electrically connected to the driving circuit using the FPC board 122, so as to provide an electric signal for the driving circuit. The electric signal is, for example, a power supply voltage (such as a VDD power signal and a VSS power signal). Certainly, the present embodiment does not limit the position of the driving chip. In other embodiments, the driving chip can further be disposed on a printed circuit board (PCB). The PCB is electrically connected to the driving circuit on the substrate base plate using an FPC board. The driving chip can further be directly disposed at an edge of the substrate base plate, and is directly electrically connected to the driving circuit. The edge is, for example, at a bottom border, an upper border, a left border, or a right border of the display panel. The display panel 100 provided in the present embodiment can include a plurality of partitions. Each partition can be provided with at least one driving circuit.

Figure 2:
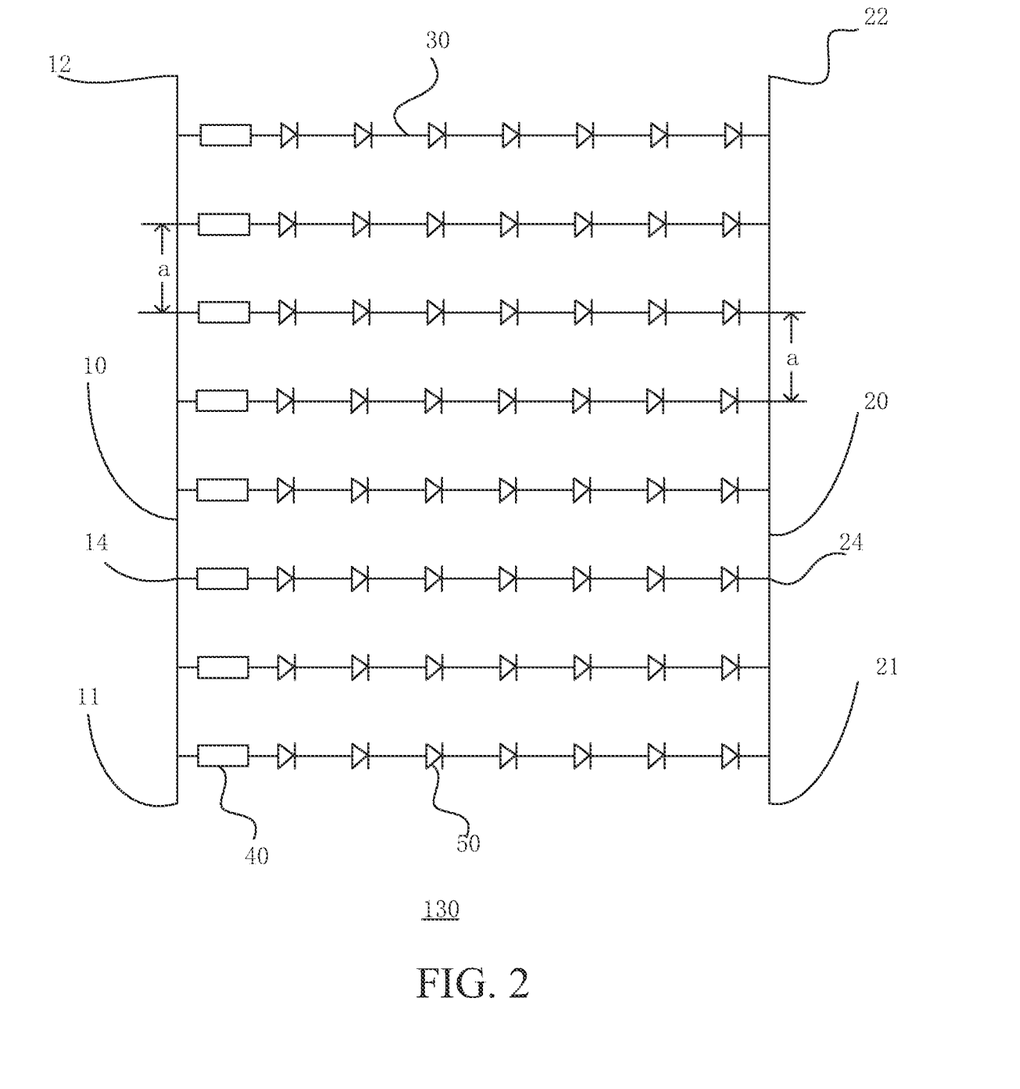
FIG. 2 is a schematic diagram of a driving circuit according to an embodiment of the present disclosure.

With reference to FIG. 1 and FIG. 2, in the present embodiment, the driving circuit 130 includes a first wire 10, a second wire 20, and a plurality of third wires 30 spaced apart from each other. The first wire 10 includes a first signal input terminal 11 and a first signal output terminal 12. The first wire 10 extends, for example, in a first direction. The second wire 20 includes a second signal input terminal 21 and a second signal output terminal 22. The second wire 20 is spaced apart from the first wire 10. The second wire 20 extends, for example, in the first direction. The second signal input terminal 21 and the first signal input terminal 11 are located on a same side. The second signal output terminal 22 and the first signal output terminal 12 are located on a same side. The plurality of third wires 30 are spaced apart from each other, for example, in the first direction. One end of each third wire 30 is electrically connected between the first signal input terminal 11 and the first signal output terminal 12 of the first wire 10. An other end of the each third wire 30 is electrically connected between the second signal input terminal 21 and the second signal output terminal 22 of the second wire 20. The each third wire 30 is provided with a current adjustment unit 40 and at least one light-emitting unit 50. The light-emitting unit 50 is an LED unit that performs a display function. Since the LED unit is current-driven to emit light, and is more sensitive to a small change in the current, a small change in the current can cause a relatively large change in brightness. Therefore, in the present embodiment, the current adjustment unit 40 is disposed on the third wire 30 configured to transmit an electrical signal to the LED unit, so as to offset a voltage drop (IR drop) of the electrical signals on the first wire 10 and the second wire 20. In this way, currents inputted to the light-emitting unit 50 on the display panel using the third wire 30 are same or very similar, Therefore, the brightness uniformity of the display panel 100 is improved, and the optical effect of the display panel 100 is improved.

In detail, resistance values of the current adjustment unit 40 on the each third wire 30 are different. The current adjustment unit 40 on the each third wire 30 that is farther away from the first signal input terminal 11 has a smaller resistance value. The driving chip 121 is disposed on a side of the substrate base plate 110, and transmits electrical signals to the first wire 10 and the second wire 20 using the first signal input terminal 11 of the first wire 10 and the second signal input terminal 21 of the second wire 20. A specific resistivity exists between the first wire 10 and the second wire 20. Therefore, in a process that the electrical signal is inputted from the first signal input terminal 11 and transmitted to the first signal output terminal 12 along the first wire 10, and inputted from the second signal input terminal 21 and transmitted to the second signal output terminal 22 along the second wire 20, a voltage value of the electrical signal is continuously attenuated. It should be noted that the electrical signal includes a positive voltage signal and a negative voltage signal. When the electrical signal is the positive voltage signal, the continuous attenuation of the voltage value of the electrical signal means that the voltage value continuously decreases. When the electrical signal is the negative voltage the continuous attenuation of the voltage value of the electrical signal means that the voltage value continuously increases. That is to say, voltage values of the electrical signals connected to two ends of the third wire 30 spaced apart between the first wire 10 and the second wire 20 are different. In addition, a larger distance between a connection node of the third wire 30 and the first wire 10 and the first signal input terminal 11 and a larger distance between a connection node of the third wire 30 and the second wire 20 and the second signal input terminal 22 indicate more serious attenuation of the electrical signal connected to the third wire 30. In the present embodiment, a smaller resistance value is set for the current adjustment unit 40 on the third wire 30 that is farther away from the first signal input terminal 11 and the second signal input terminal 21. The resistance value of the current adjustment unit 40 on the third wire 30 that is closer to the first signal input terminal 11 and the second signal input terminal 21 is set to be larger. In this way, the resistance of the current adjustment unit 40 on the third wire 30 can be used to balance resistances of the wires at a near end and a far end of the first wire 10 and the second wire 20, so that the currents inputted to the third wires 30 are same or very similar, thereby ensuring the uniformity of luminance of the LED unit.

In the present embodiment, the first signal input terminal 11 of the first wire 10 is configured to input a first level signal, and the second signal input terminal 21 of the second wire 20 is configured to input a second level signal. The first level signal is, for example, a VDD power signal, and the second level signal is, for example, a VSS power signal.

Further, the VDD power signal can be a positive potential signal, and the VSS power signal can be a negative potential signal.

As described above, a specific resistance exists between the first wire 10 and the second wire 20. Therefore, potentials of the first level signal at the first signal input terminal 11 and the first signal output terminal 12 are different, and potentials of the second level signal at the second signal input terminal 21 and the second signal output terminal 22 are different.

In the present embodiment, the first wire 10 includes a plurality of first nodes 14 spaced apart between the first signal input terminal 11 and the first signal output terminal 12. Each first node 14 is electrically connected to one end of the third wire 30. The second wire 20 includes a plurality of second nodes 24 spaced apart between the second signal input terminal 21 and the second signal output terminal 22. Each second node 24 is correspondingly electrically connected to an other end of the third wire 30. A resistance value of the first wire 10 between any two adjacent first nodes 14 is m, and a resistance value of the second wire 20 between any two adjacent second nodes 24 is m, wherein m>0.

In the present embodiment, n third wires 30 are disposed (only 8 third wires are schematically drawn in FIG. 2). The n third wires 30 are arranged in sequence in a direction away from the first signal output terminal 12 of the first wire 10. The resistance value of the current adjustment unit 40 on an $n^{th}$ third wire 30 is fixed. In detail, the resistance value of the current adjustment unit 40 on a $1^{st}$ third wire 30 is $1*(1-1)*m$. The resistance value of the current adjustment unit 40 on a $2^{nd}$ third wire 30 is $2*(2-1)*m$. The resistance value of the current adjustment unit 40 on a $3_{rd}$ third wire 30 is $3*(3-2)*m$. The resistance value of the current adjustment unit 40 on an $n^{th}$ third wire 30 is $n*(n-1)*m$, wherein n is an integer greater than 1. In the driving circuit provided in the embodiment of the present disclosure, the current adjustment unit 40 having a specific resistance value is disposed on each third wire 30. In this way, the voltage drop of the first level signal and the second level signal on the first wire 10 and the second wire 20 can be effectively eliminated, and the currents on the each third wire 30 are made uniform, thereby improving the display effect of the display panel 100.

In the present embodiment, the current adjustment unit 40 and the third wire 30 are disposed on a same layer. That is to say, the current adjustment unit 40 can be made together with the third wire 30 using a patterning process, so as to simplify the manufacturing process. In detail, the current adjustment unit 40 can be a serpentine metal trace, a metal block, a digital resistor that can be adjusted and changed by the system, or a chip resistor having a specific resistance value.

Preferably, the first wire 10 and the second wire 20 are metal traces having a same material and a same film layer structure. The metal traces are made of materials, such as copper, silver, aluminum, gold, a metal alloy, ITO, IZO, and the like that have high electric conductivity. The metal traces can form a single metal level structure or a multi-metal level structure. Certainly, the embodiment of the present disclosure does not limit the material and the level structure of the first wire 10 and the second wire 20.

Further, a spacing between any two adjacent first nodes 14 is a, and a spacing between any two adjacent second nodes 24 is a, wherein a is greater than 0. The material and the film layer structure of the first wire 10 and the second wire 20 are same. That is to say, the resistivities of the first wire 10 and the second wire 20 are same. Therefore, the voltage drops on any two adjacent third wires 30 are same. In this way, such a wire arrangement mode facilitates the standardized design of the current adjustment unit 40. Preferably, the current adjustment unit 40 is a trace having a same width as the first wire 10 and the second wire 20, and the trace is disposed on a same layer as the first wire 10 and the second wire 20. That is to say, the current adjustment unit 40 adopts a same trace structure as the first wire 10 and the second wire 20, so as to ensure that the current adjustment unit 40 has a same resistivity as the first wire 10 and the second wire 20, Therefore, in the wire design of the driving circuit 130, it is only necessary to control the trace length of the current adjustment unit 40 on each third wire 30 to offset the voltage drop, thereby improving the effect of current uniformity in the each third wire. In the present embodiment, the current adjustment unit 40 is, for example, a serpentine trace.

In the present embodiment, n third wires 30 are disposed. The n third wires 30 are arranged in sequence in a direction away from the first signal output terminal of the first wire 10. A trace length of the current adjustment unit 40 on an $n^{th}$ third wire 30 is fixed. In detail, the trace length is equal to $n*(n-1)*a$, wherein n is an integer greater than 1. The design of the driving circuit provided in the present embodiment can be simplified by controlling the trace length of the current adjustment unit 40 on each third wire 30 while offsetting the voltage drop and accurately achieving the current uniformity of the plurality of third wires 30, thereby saving production and manufacturing costs.

In the present embodiment, the current adjustment unit 40 can be made together with the first wire 10, the second wire 20, and the third wire 30 using a patterning process, so as to further simplify the manufacturing process.

Embodiment 2

Figure 3:
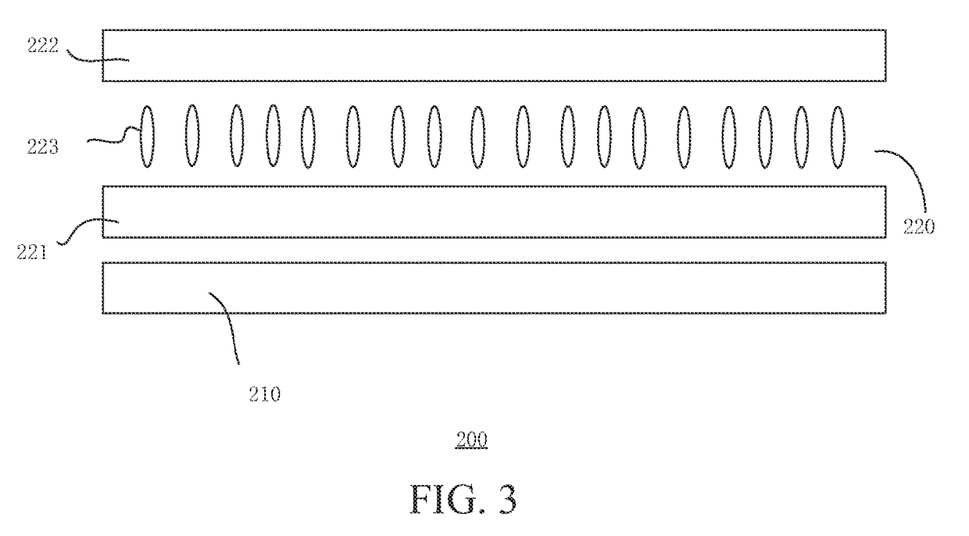
FIG. 3 is a schematic diagram of a display panel according to another embodiment of the present disclosure.

Referring to FIG. 3, an embodiment of the present disclosure provides a display panel 200. The display panel 200 is, for example, an LCD panel having a mini-LED unit as a backlight structure 210. The LCD panel can be a vertical alignment (VA) liquid crystal display panel, an in-plane switching (IPS) liquid crystal display panel, or a fringe-field switching (FFS) liquid crystal display. The display panel includes the backlight structure 210 and a liquid crystal cell 220 disposed on a light exit side of the backlight structure 210.

The backlight structure 210 includes: a substrate base plate, wherein the substrate base plate can be a flexible base plate or a rigid base plate; a driving circuit, disposed on the substrate base plate; and a COF, disposed on a side of the substrate base plate and electrically connected to the driving circuit on the substrate base plate by means of binding, wherein the COF includes a driving chip and an FPC board, wherein the driving chip is electrically connected to the driving circuit using the FPC board, so as to provide an electric signal for the driving circuit. The electric signal is, for example, a power supply voltage (such as a VDD power signal and a VSS power signal). Certainly, the present embodiment does not limit the position of the driving chip. In other embodiments, the driving chip can further be disposed on a PCB. The PCB is electrically connected to the driving circuit on the substrate base plate using an FPC board. The driving chip can further be directly disposed at an edge of the substrate base plate, and is directly electrically connected to the driving circuit.

The driving circuit includes: a first wire, including a first signal input terminal and a first signal output terminal, wherein the first wire extends, for example, in a first direction; a second wire, including a second signal input terminal and a second signal output terminal, wherein the second wire is spaced apart from the first wire, the second wire extends, for example, in the first direction, the second signal input terminal and the first signal input terminal are located on a same side, and the second signal output terminal and the first signal output terminal are located on a same side; and a plurality of third wires, spaced apart from each other, wherein the plurality of third wires are arranged in the first direction, for example, one end of each third wire is electrically connected between the first signal input terminal and the first signal output terminal of the first wire, and an other end of the each third wire is electrically connected between the second signal input terminal and the second signal output terminal of the second wire. The each third wire is provided with a current adjustment unit and at least one light-emitting unit. The light-emitting unit provides the liquid crystal cell 220 with light required for display, and is an LED unit in detail. Since the LED unit is current-driven to emit light, and is more sensitive to a small change in the current, a small change in the current can cause a relatively large change in brightness. Therefore, in the present embodiment, the current adjustment unit is disposed on the third wire configured to transmit an electrical signal for the LED unit, Resistance values of the current adjustment unit on each third wire are different, and the current adjustment unit on the third wire that is farther away from the first signal input terminal has a smaller resistance value, so as to offset a voltage drop of the electrical signals on the first wire and the second wire. In this way, currents inputted to the light-emitting unit on the display panel using the third wire are same or very similar. Therefore, the brightness uniformity of the display panel is improved, and the optical effect of the display panel is improved.

It should be noted that the driving circuit provided in the present embodiment and the driving circuit provided in Embodiment I are similar in the circuit structure. Same parts will not be described herein again in the present embodiment.

The liquid crystal cell 220 includes: a first base plate 221, a second base plate 222, and a liquid crystal layer 223 disposed between the first base plate 221 and the second base plate 222, The first base plate 221 is, for example, an array base plate. The array base plate is provided with thin film transistors arranged in an array. The second base plate 222 is, for example, a color filter base plate. The color filter base plate is provided with a color filter and a black matrix (BM). Certainty, in other embodiments, the color filter and/or the BM can alternatively be disposed on the array base plate.

Based on the above, the display panel disclosed in the present disclosure and the driving circuit applicable to the display panel can improve the problem of uneven brightness of the light-emitting unit caused by the voltage drop of the electrical signal.

A driving circuit and a display panel provided in the embodiments of the present disclosure are described in detail above. Although the principles and implementations of the present disclosure are described by using specific examples in this specification, the descriptions of the foregoing embodiments are merely intended to help understand the method and the core idea of the method in the present disclosure. A person of ordinary skill in the art should understand that modifications can be still made to the technical solutions described in the foregoing embodiments or equivalent replacements can be made to some technical features thereof, as long as such modifications or replacements do not make the essence of corresponding technical solutions depart from the scope of the technical solutions of the embodiments of the present disclosure.

What is claimed is:

1. A driving circuit, comprising:
   a first wire, comprising a first signal input terminal and a first signal output terminal;
   a second wire, comprising a second signal input terminal and a second signal output terminal, wherein the second wire is spaced apart from the first wire, and the second signal input terminal and the first signal input terminal are located on a same side; and
   a plurality of third wires, spaced apart from each other, wherein one end of each third wire is electrically connected between the first signal input terminal and the first signal output terminal, and an other end of the each third wire is electrically connected between the second signal input terminal and the second signal output terminal, wherein
   a current adjustment unit and at least one light-emitting unit are disposed on the each third wire, each current adjustment unit has a different resistance value, and the current adjustment unit on the each third wire that is farther away from the first signal input terminal and the second signal input terminal has a smaller resistance value.

2. The driving circuit as claimed in claim 1, wherein the first signal input terminal is configured to receive a first level signal, the second signal input terminal is configured to receive a second level signal, the first level signal is a VDD power signal, and the second level signal is a VSS power signal.

3. The driving circuit as claimed in claim 2, wherein potentials of the first level signal at the first signal input terminal and the first signal output terminal are different, and potentials of the second level signal at the second signal input terminal and the second signal output terminal are different.

4. The driving circuit as claimed in claim 1, wherein the first wire comprises a plurality of first nodes spaced apart between the first signal input terminal and the first signal output terminal, and each first node is correspondingly electrically connected to one end of the each third wire; and the second wire comprises a plurality of second nodes spaced apart between the second signal input terminal and the second signal output terminal, and each second node is correspondingly electrically connected to an other end of the each third wire.

5. The driving circuit as claimed in claim 4, wherein a resistance value of the first wire between 30 any two adjacent first nodes is m, and a resistance value of the second wire between any two adjacent second nodes is m, wherein m>0.

6. The driving circuit as claimed in claim 5, wherein a quantity of the third wires is n, and $1^{st}$-$n^{th}$ third wires are sequentially arranged in a direction away from the first signal output terminal and the second signal input terminal, wherein a resistance value of the current adjustment unit on the $n^{th}$ third wire is $n*(n-1)*m$, and n is an integer greater than 1.

7. The driving circuit as claimed in claim 6, wherein a spacing between any two adjacent first nodes is a, and a spacing between any two adjacent second nodes is a, wherein a>0.

8. The driving circuit as claimed in claim 7, wherein the current adjustment unit is a trace having a same width as the first wire and the second wire, and a trace length of the current adjustment unit on the $n^{th}$ third wire is $n*(n-1)*a$, wherein n is an integer greater than 1.

9. The driving circuit as claimed in claim 1, wherein the current adjustment unit is disposed on a same layer as the each third wire, and is a serpentine metal trace, a metal block, a digital resistor, or a chip resistor.

10. The driving circuit as claimed in claim 1, wherein the light-emitting unit is a light-emitting diode (LED) unit.

11. A display panel, comprising: a substrate base plate, a chip on film (COF), and a driving circuit, wherein the driving circuit comprises:
    a first wire, comprising a first signal input terminal and a first signal output terminal;
    a second wire, comprising a second signal input terminal and a second signal output terminal, wherein the second wire is spaced apart from the first wire, and the second signal input terminal and the first signal input terminal are located on a same side; and
    a plurality of third wires, spaced apart from each other, wherein one end of each third wire is electrically connected between the first signal input terminal and the first signal output terminal, and an other end of the each third wire is electrically connected between the second signal input terminal and the second signal output terminal, wherein
    a current adjustment unit and at least one light-emitting unit are disposed on the each third wire, each current adjustment units has a different resistance value, the current adjustment unit on the each third wire that is farther away from the first signal input terminal and the second signal input terminal has a smaller resistance value, the COF is disposed on a side of the substrate base plate, and the first wire and the second wire in the driving circuit are electrically connected to the COF.

12. The display panel as claimed in claim 11, wherein the first signal input terminal is configured to receive a first level signal, the second signal input terminal is configured to receive a second level signal, the first level signal is a VDD power signal, and the second level signal is a VSS power signal.

13. The display panel as claimed in claim 12, wherein potentials of the first level signal at the first signal input terminal and the first signal output terminal are different, and potentials of the second level signal at the second signal input terminal and the second signal output terminal are different.

14. The display panel as claimed in claim 11, wherein the first wire comprises a plurality of first nodes spaced apart between the first signal input terminal and the first signal output terminal, and each first node is correspondingly electrically connected to one end of the each third wire; and the second wire comprises a plurality of second nodes spaced apart between the second signal input terminal and the second signal output terminal, and each second node is correspondingly electrically connected to an other end of the each third wire.

15. The display panel as claimed in claim 14, wherein a resistance value of the first wire between any two adjacent first nodes is m, and a resistance value of the second wire between any two adjacent second nodes is m, wherein m>0.

16. The display panel as claimed in claim 15, wherein a quantity of the third wires is n, and $1^{st}$-$n^{th}$ third wires are sequentially arranged in a direction away from the first signal output terminal and the second signal input terminal, wherein a resistance value of the current adjustment unit on the nth third wire is $n*(n-1)*m$, and n is an integer greater than 1.

17. The display panel as claimed in claim 16, wherein a spacing between any two adjacent first nodes is a, and a spacing between any two adjacent second nodes is a, wherein a>0.

18. The display panel as claimed in claim 17, wherein the current adjustment unit is a trace having a same width as the first wire and the second wire, and a trace length of the current adjustment unit on the $n^{th}$ third wire is $n*(n-1)*a$, wherein n is an integer greater than 1.

19. The display panel as claimed in claim 11, wherein the current adjustment unit is disposed on a same layer as the each third wire, and is a serpentine metal trace, a metal block, a digital resistor, or a chip resistor.

20. The display panel as claimed in claim 1, wherein the light-emitting unit is an LED unit.

* * * * *